(12) United States Patent
Vinegar et al.

(10) Patent No.: US 7,114,561 B2
(45) Date of Patent: Oct. 3, 2006

(54) WIRELESS COMMUNICATION USING WELL CASING

(75) Inventors: Harold J. Vinegar, Houston, TX (US); Robert Rex Burnett, Katy, TX (US); William Mountjoy Savage, Houston, TX (US); Frederick Gordon Carl, Jr., Houston, TX (US); Ilya Emil Berchenko, Friendswood, TX (US)

(73) Assignee: Shell Oil Company, Houston, TX (US)

( * ) Notice: Subject to any disclaimer, the term of this patent is extended or adjusted under 35 U.S.C. 154(b) by 75 days.

(21) Appl. No.: 10/220,195

(22) PCT Filed: Mar. 2, 2001

(86) PCT No.: PCT/US01/06907

§ 371 (c)(1),
(2), (4) Date: Aug. 28, 2002

(87) PCT Pub. No.: WO01/65066

PCT Pub. Date: Sep. 7, 2001

(65) Prior Publication Data

US 2003/0042016 A1 Mar. 6, 2003

Related U.S. Application Data

(60) Provisional application No. 60/186,378, filed on Mar. 2, 2000, provisional application No. 60/186,381, filed on Mar. 2, 2000, provisional application No. 60/186,377, filed on Mar. 2, 2000, provisional application No. 60/186,531, filed on Mar. 2, 2000, provisional application No. 60/177,998, filed on Jan. 24, 2000, provisional application No. 60/186,527, filed on Mar. 2, 2000, provisional application No. 60/186,503, filed on Mar. 2, 2000, provisional application No. 60/186,382, filed on Mar. 2, 2000, provisional application No. 60/186,394, filed on Mar. 2, 2000, provisional application No. 60/186,379, filed on Mar. 2, 2000, provisional application No. 60/186,504, filed on Mar. 2, 2000, provisional application No. 60/186,505, filed on Mar. 2, 2000, provisional application No. 60/186,380, filed on Mar. 2, 2000, provisional application No. 60/186,376, filed on Mar. 2, 2000, provisional application No. 60/181,322, filed on Feb. 9, 2000, provisional application No. 60/177,997, filed on Jan. 24, 2000, provisional application No. 60/177,883, filed on Jan. 24, 2000, provisional application No. 60/178,001, filed on Jan. 24, 2000, provisional application No. 60/178,000, filed on Jan. 24, 2000, provisional application No. 60/177,999, filed on Jan. 24, 2000.

(51) Int. Cl.
*E21B 47/12* (2006.01)

(52) U.S. Cl. .................. 166/250.01; 166/65.1; 166/66; 340/854.4; 340/854.3

(58) Field of Classification Search ............... 166/66, 166/250.01, 250.11, 65.1; 340/854.3–854.6
See application file for complete search history.

(56) References Cited

U.S. PATENT DOCUMENTS

| | | | |
|---|---|---|---|
| 525,663 A | 9/1894 | Mottinger | |
| 2,917,004 A | 12/1959 | Davis et al. | 103/233 |
| 3,083,771 A | 4/1963 | Chapman | 166/146 |
| 3,247,904 A | 4/1966 | Wakefield, Jr. | 166/116 |
| 3,427,989 A | 2/1969 | Bostock et al. | 103/232 |
| 3,456,273 A * | 7/1969 | Brock | 336/62 |
| 3,566,963 A | 3/1971 | Blackledge | 166/189 |
| 3,602,305 A | 8/1971 | Kisling, III | 116/134 |
| 3,732,728 A | 5/1973 | Fitzpatrick | 73/151 |
| 3,793,632 A | 2/1974 | Still | 340/18 |
| 3,814,545 A | 6/1974 | Waters | 417/90 |
| 3,837,618 A | 9/1974 | Juhel | 251/129 |
| 3,980,826 A | 9/1976 | Widmer | 178/68 |
| 4,068,717 A | 1/1978 | Needham | 166/272 |
| 4,087,781 A | 5/1978 | Grossi et al. | 340/18 |
| 4,295,795 A | 10/1981 | Gass et al. | 417/111 |
| 4,393,485 A | 7/1983 | Redden | 367/25 |
| 4,468,665 A | 8/1984 | Thawley et al. | |
| 4,545,731 A | 10/1985 | Canalizo et al. | 417/86 |
| 4,576,231 A | 3/1986 | Dowling et al. | 166/248 |

| | | |
|---|---|---|
| 4,578,675 A | 3/1986 | MacLeod |
| 4,596,516 A | 6/1986 | Scott et al. .................... 417/58 |
| 4,630,243 A | 12/1986 | MacLeod .................... 367/82 |
| 4,648,471 A | 3/1987 | Bordon |
| 4,662,437 A | 5/1987 | Renfro ...................... 166/65.1 |
| 4,681,164 A | 7/1987 | Stacks ........................ 166/304 |
| 4,709,234 A | 11/1987 | Forehand et al. ........... 340/856 |
| 4,738,313 A | 4/1988 | McKee ....................... 166/372 |
| 4,739,325 A | 4/1988 | MacLeod .................... 340/854 |
| 4,839,644 A | 6/1989 | Safinya et al. |
| 4,886,114 A | 12/1989 | Perkins et al. ............. 166/65.1 |
| 4,901,069 A | 2/1990 | Veneruso ................... 340/853 |
| 4,972,704 A | 11/1990 | Wellington |
| 4,981,173 A | 1/1991 | Perkins et al. ............. 166/66.4 |
| 5,001,675 A | 3/1991 | Woodward |
| 5,008,664 A | 4/1991 | More et al. ................. 340/854 |
| 5,130,706 A | 7/1992 | Van Steenwyk |
| 5,134,285 A | 7/1992 | Perry et al. |
| 5,160,925 A | 11/1992 | Dailey et al. ............ 340/853.3 |
| 5,162,740 A | 11/1992 | Jewell ........................ 324/347 |
| 5,172,717 A | 12/1992 | Boyle et al. ................. 137/155 |
| 5,176,164 A | 1/1993 | Boyle ......................... 137/155 |
| 5,191,326 A | 3/1993 | Montgomery ............ 340/855.5 |
| 5,230,383 A | 7/1993 | Pringle et al. ............. 166/66.4 |
| 5,246,860 A | 9/1993 | Hutchins et al. .............. 436/27 |
| 5,251,328 A | 10/1993 | Shaw ........................... 455/73 |
| 5,257,663 A | 11/1993 | Pringle et al. ............. 166/66.4 |
| 5,267,469 A | 12/1993 | Espinoza .................... 73/40.5 |
| 5,278,758 A | 1/1994 | Perry et al. |
| 5,331,318 A | 7/1994 | Montgomery ............ 340/855.4 |
| 5,353,627 A | 10/1994 | Diatschenko et al. ...... 73/19.03 |
| 5,358,035 A | 10/1994 | Grudzinski ................... 166/53 |
| 5,367,694 A | 11/1994 | Ueno ......................... 395/800 |
| 5,394,141 A | 2/1995 | Soulier |
| 5,396,232 A | 3/1995 | Mathieu et al. .......... 340/854.5 |
| 5,425,425 A | 6/1995 | Bankston et al. ........... 166/377 |
| 5,447,201 A | 9/1995 | Mohn ......................... 166/375 |
| 5,458,200 A | 10/1995 | Lagerlef et al. ............ 166/372 |
| 5,467,083 A | 11/1995 | McDonald et al. |
| 5,473,321 A | 12/1995 | Goodman et al. ........ 340/854.9 |
| 5,493,288 A | 2/1996 | Henneuse |
| 5,531,270 A | 7/1996 | Fletcher et al. ............... 166/53 |
| 5,561,245 A | 10/1996 | Georgi et al. ............ 73/152.02 |
| 5,574,374 A | 11/1996 | Thompson et al. |
| 5,576,703 A | 11/1996 | MacLeod |
| 5,587,707 A | 12/1996 | Dickie et al. .......... 340/870.09 |
| 5,592,438 A | 1/1997 | Rorden et al. ................ 367/83 |
| 5,662,165 A | 9/1997 | Tubel et al. |
| 5,723,781 A | 3/1998 | Pruett et al. ............. 73/152.18 |
| 5,730,219 A | 3/1998 | Tubel et al. |
| 5,745,047 A | 4/1998 | Van Gisbergen et al. ........................ 340/853.1 |
| 5,782,261 A | 7/1998 | Becker et al. ............... 137/155 |
| 5,797,453 A | 8/1998 | Hisaw ..................... 166/117.5 |
| 5,881,807 A | 3/1999 | Boe et al. ................... 166/100 |
| 5,883,516 A | 3/1999 | Van Steenwyk |
| 5,887,657 A | 3/1999 | Bussear et al. |
| 5,896,924 A | 4/1999 | Carmody et al. ............. 166/53 |
| 5,934,371 A | 8/1999 | Bussear et al. |
| 5,937,945 A | 8/1999 | Bussear et al. ........ 166/250.15 |
| 5,941,307 A | 8/1999 | Tubel |
| 5,955,666 A | 9/1999 | Mullins .................... 73/152.18 |
| 5,959,499 A | 9/1999 | Khan et al. .................. 330/149 |
| 5,960,883 A | 10/1999 | Tubel et al. ................. 166/313 |
| 5,963,090 A | 10/1999 | Fukuchi ...................... 330/149 |
| 5,971,072 A | 10/1999 | Huber et al. ................ 166/297 |
| 5,975,204 A | 11/1999 | Tubel et al. ........... 166/250.15 |
| 5,995,020 A | 11/1999 | Owens et al. ............ 340/854.9 |
| 6,012,015 A | 1/2000 | Tubel ............................ 702/6 |
| 6,012,016 A | 1/2000 | Bilden et al. ................. 702/12 |
| 6,070,608 A | 6/2000 | Pringle ....................... 137/155 |
| 6,123,148 A | 9/2000 | Oneal ......................... 166/118 |
| 6,148,915 A | 11/2000 | Mullen et al. ............... 166/278 |
| 6,192,983 B1 | 2/2001 | Neuroth et al. ........ 166/250.15 |
| 6,208,586 B1 | 3/2001 | Rorden et al. ................ 367/35 |
| 6,334,486 B1 | 1/2002 | Carmody et al. ............. 166/53 |
| 6,429,784 B1* | 8/2002 | Beique et al. ........... 340/853.2 |
| 6,443,228 B1* | 9/2002 | Aronstam et al. ...... 166/250.11 |
| 6,484,800 B1 | 11/2002 | Carmody et al. ............. 166/53 |
| 6,515,592 B1* | 2/2003 | Babour et al. ........... 340/854.4 |

FOREIGN PATENT DOCUMENTS

| | | |
|---|---|---|
| EP | 28296 | 5/1981 |
| EP | 0 295 178 | 12/1988 |
| EP | 0 339 825 | 11/1989 |
| EP | 295278 B1 | 5/1991 |
| EP | 492856 A2 | 7/1992 |
| EP | 641916 | 3/1995 |
| EP | 681090 A2 | 11/1995 |
| EP | 697500 A2 | 2/1996 |
| EP | 0 721 053 A1 | 7/1996 |
| EP | 721053 A1 | 7/1996 |
| EP | 732053 | 9/1996 |
| EP | 919696 A2 | 6/1999 |
| EP | 922835 A2 | 6/1999 |
| EP | 930518 A2 | 7/1999 |
| EP | 0 964 134 A2 | 12/1999 |
| EP | 972909 A2 | 1/2000 |
| EP | 999341 A2 | 5/2000 |
| EP | 964134 B1 | 8/2003 |
| FR | 2677134 | 12/1992 |
| GB | 2083321 A | 3/1982 |
| GB | 2325949 A | 2/1999 |
| GB | 2327695 A | 2/1999 |
| GB | 2338253 A | 12/1999 |
| WO | 80 00727 | 4/1980 |
| WO | 93/26115 | 12/1993 |
| WO | 96/00836 | 1/1996 |
| WO | 96/24747 | 8/1996 |
| WO | 97/16751 | 5/1997 |
| WO | 97 37103 | 10/1997 |
| WO | 98/20233 | 5/1998 |
| WO | 99 37044 | 7/1999 |
| WO | 99/37044 | 7/1999 |
| WO | 99/57417 | 11/1999 |
| WO | 99/60247 | 11/1999 |
| WO | 00/04275 | 1/2000 |
| WO | 00/37770 | 6/2000 |
| WO | 01/20126 A2 | 3/2001 |
| WO | 01/55555 A1 | 8/2001 |

OTHER PUBLICATIONS

Brown, Connolizo and Robertson, West Texas Oil Lifting Short Course and H.W. Winkler, "Misunderstood or overlooked Gas-Lift Design and Equipment Considerations," SPE, pp. 351-368 (1994).

Der Spek, Alex, and Aliz Thomas, "Neural-Net Identification of Flow Regime with Band Spectra of Flow-Generated Sound", SPE Reservoir Eva. & Eng.2 (6) Dec. 1999, pp. 489-498.

Sakata et al., "Performance Analysis of Long Distance Transmitting of Magnetic Signal on Cylindrical Steel Rod", IEEE Translation Journal on magnetics in Japan, vol. 8, No. 2. Feb. 1993, pp. 102-106.

Otis Engineering, Aug. 1980, "Heavy Crude Lift System", Field Development Report, OEC 5228, Otis Corp., Dallas, Texas, 1980.

Office Action dated Sep. 22, 2003, Jan. 29, 2003, U.S. Appl. No. 09/769,048, Bass.

Office Action dated Oct. 24, 2003, Feb. 21, 2003, Feb. 28, 2002, U.S. Appl. No. 09/768,705, Vinegar.

Office Action dated Apr. 08, 2005, U.S. Appl. No. 10/220,253, Hirsch.

* cited by examiner

Primary Examiner—David Bagnell
Assistant Examiner—G. M. Collins
(74) Attorney, Agent, or Firm—Rachel A. Stiegel

(57) ABSTRACT

A petroleum well having a borehole extending into a formation is provided. A piping structure is positioned within the borehole, and an induction choke is positioned around the piping structure downhole. A communication system is provided along the piping structure between a surface of the well and the induction choke. A downhole module is positioned on an exterior surface of the piping structure and is configured to measure characteristics of the formation. The formation characteristics, such as pressure and resistivity, are communicated to the surface of the well along the piping structure.

16 Claims, 1 Drawing Sheet

WIRELESS COMMUNICATION USING WELL CASING

CROSS-REFERENCES TO RELATED APPLICATIONS

This application claims the benefit of the following U.S. Provisional Applications, all of which are hereby incorporated by reference:

COMMONLY OWNED AND PREVIOUSLY FILED U.S. PROVISIONAL PATENT APPLICATIONS

| T&K # | Serial Number | Title | Filing Date |
|---|---|---|---|
| TH 1599 | 60/177,999 | Toroidal Choke inductor for Wireless Communication and Control | Jan. 24, 2000 |
| TH 1600 | 60/178,000 | Ferromagnetic Choke in Wellhead | Jan. 24, 2000 |
| TH 1602 | 60/178,001 | Controllable Gas-Lift Well and Valve | Jan. 24, 2000 |
| TH 1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24, 2000 |
| TH 1669 | 60/177,997 | System and Method for Fluid Flow Optimization | Jan. 24, 2000 |
| TS 6185 | 60/181,322 | A Method and Apparatus for the Optimal Predistortion of an Electromagnetic Signal in a Downhole Communications System | Feb. 9, 2000 |
| TH 1599x | 60/186,376 | Toroidal Choke Inductor for Wireless Communication and Control | Mar. 2, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,394 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift Well and Field Performance | Mar. 2, 2000 |
| TH 1722 | 60/186,381 | Controlled Downhole Chemical Injection | Mar. 2, 2000 |
| TH 1723 | 60/186,378 | Wireless Power and Communications Cross-Bar Switch | Mar. 2, 2000 |

The current application shares some specification and figures with the following commonly owned and concurrently filed applications, all of which are hereby incorporated by reference:

COMMONLY OWNED AND CONCURRENTLY FILED U.S PATENT APPLICATIONS

| T&K # | Serial Number | Title | Filing Date |
|---|---|---|---|
| TH 1601 | 10/220,254 | Reservoir Production Control from Intelligent Well Data | Aug. 29, 2002 |
| TH 1671 | 10/220,251 | Tracer Injection in a Production Well | Aug. 29, 2002 |
| TH 1672 | 10/220,402 | Oil Well Casing Electrical Power Pick-Off Points | Aug. 29, 2002 |
| TH 1673 | 10/220,252 | Controllable Production Well Packer | Aug. 29, 2002 |
| TH 1674 | 10/220,249 | Use of Downhole High Pressure Gas in a Gas-Lift Well | Aug. 29, 2002 |
| TH 1677 | 10/220,253 | Method for Downhole Power Management Using Energization from Distributed Batteries or Capacitors with Reconfigurable Discharge | Aug. 29, 2002 |
| TH 1679 | 10/220,453 | Wireless Downhole Well Interval Inflow and Injection Control | Aug. 29, 2002 |
| TH 1704 | 10/22,326 | Downhole Rotary Hydraulic Pressure for Valve Actuation | Aug. 29, 2002 |
| TH 1705 | 10/220,455 | Wireless Downhole Measurement and Control For Optimizing Gas Lift Well and Field Performance | Aug. 29, 2002 |
| TH 1722 | 10/220,372 | Controlled Downhole Chemical Injection | Aug. 30, 2002 |
| TH 1723 | 10/220,652 | Wireless Power and Communications Cross-Bar Switch | Aug. 29, 2002 |

The current application shares some specification and figures with the following commonly owned and previously filed applications, all of which are hereby incorporated by reference:

COMMONLY OWNED AND PREVIOUSLY FILED U.S. PATNENT APPLICATIONS

| T&K # | Serial Number | Title | Filing Date |
|---|---|---|---|
| TH 1599US | 09/769,047 | Choke Inductor for Wireless Communication and Control | Oct. 20, 2003 |
| TH 1600US | 09/769,048 | Induction Choke for Power Distribution in Piping Structure | Jan. 24, 2001 |
| TH 1602US | 09/768,705 | Controllable Gas-Lift Well and Valve | Jan. 24, 2001 |
| TH 1603US | 09/768,655 | Permanent Downhole, Wireless, Two-Way Telemetry Backbone Using Redundant Repeater | Jan. 24, 2001 |
| TH 1668US | 09/768,046 | Petroleum Well Having Downhole Sensors, Communication, and Power | Jan. 24, 2001 |
| TH 1669US | 09/768,656 | System and Method for Fluid Flow Optimization | Jan. 24, 2001 |
| TS 6185 | 09/779,935 | A Method and Apparatus for the Optimal Predistortion of an Electro Magnetic Signal in a Downhole Communications System | Feb. 8, 2001 |

The benefit of 35 U.S.C. §120 is claimed for all of the above referenced commonly owned applications. The applications referenced in the tables above are referred to herein as the "Related Applications."

BACKGROUND OF THE INVENTION

1. Field of the Invention

The present invention relates in general to petroleum wells, and in particular to a petroleum well having a casing which is used as a conductive path to transmit wireless spread spectrum communications between surface equipment and a downhole module used to measure physical characteristics of a petroleum formation or condition of well structures.

2. Description of Related Art

Several methods have been devised to place electronics, sensors, or controllable valves downhole along an oil production tubing string, but all such known devices typically use an internal or external cable along the tubing string to provide power and communications downhole. It is, of course, highly undesirable and in practice difficult to use a cable along the tubing string either integral to the tubing string or spaced in the annulus between the tubing string and the casing. The use of a cable presents difficulties for well operators while assembling and inserting the tubing string into a borehole. Additionally, the cable is subjected to corrosion and heavy wear due to movement of the tubing string within the borehole. An example of a downhole communication system using a cable is shown in PCT/EP97/01621.

U.S. Pat. No. 4,839,644 describes a method and system for wireless two-way communications in a cased borehole having a tubing string. However, this system describes a communication scheme for coupling electromagnetic energy in a TEM mode using the annulus between the casing and the tubing. This inductive coupling requires a substantially nonconductive fluid such as crude oil in the annulus between the casing and the tubing. Therefore, the invention described in U.S. Pat. No. 4,839,644 has not been widely adopted as a practical scheme for downhole two-way communication. Another system for downhole communication using mud pulse telemetry is described in U.S. Pat. Nos. 4,648,471 and 5,887,657. Although mud pulse telemetry can be successful at low data rates, it is of limited usefulness where high data rates are required or where it is undesirable to have complex, mud pulse telemetry equipment downhole. Other methods of communicating within a borehole are described in U.S. Pat. Nos. 4,468,665; 4,578,675; 4,739,325; 5,130,706; 5,467,083; 5,493,288; 5,576,703; 5,574,374; and 5,883,516. Similarly, several permanent downhole sensors and control systems have been described in U.S. Pat. Nos. 4,972,704; 5,001,675; 5,134,285; 5,278,758; 5,662,165; 5,730,219; 5,934,371; and 5,941,307.

Due to the limited success of wireless communication within a borehole, the current use of downhole measurement and control equipment is minimal. A lack of downhole measurement and control restricts the ability to maximize economic return by optimizing production of the well.

It would, therefore, be a significant advance in the operation of petroleum wells if an alternate means for providing communications within a well were provided. More specifically, it would be advantageous if downhole physical characteristics of the formation could be easily communicated to the surface of the well. This information could then be used to increase the aggregate recovery of formation reserves, and would thereby optimize production of the well.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems associated with communicating in the borehole of a petroleum well are solved by the present invention. The metal well casing is used as a power and communications path between the surface and downhole modules, with a formation ground used as the return path to complete the electrical circuit. Communications are implemented using spread-spectrum transceivers at the wellhead and at the downhole modules. The communications enable transmission of measurements from downhole sensors to the surface and control of downhole devices.

A petroleum well according to the present invention includes a downhole module and a communications system. The downhole module is positioned on an exterior surface of a piping structure, the piping structure being positioned within a borehole of the petroleum well that extends into a formation. The downhole module collects formation data from the formation and communicates the data by using the communication system. The signals transmitted by the communication system are passed along the piping structure.

A method for assessing a formation according to the present invention is applied to a petroleum well having a borehole that extends into the formation. The petroleum well also includes a piping structure that is positioned within the borehole. The method includes the step of sensing a formation characteristic within the formation and then communicating information about the formation characteristic along the piping structure of the well.

A downhole module according to the present invention is adapted for coupling to a piping structure of a petroleum well. The module includes a sensor that is used to sense a physical characteristic of a formation surrounding the piping structure. A downhole modem is used to transmit data representing the physical characteristic along the piping structure of the well.

DESCRIPTION OF THE PREFERRED EMBODIMENTS

Figure 1:
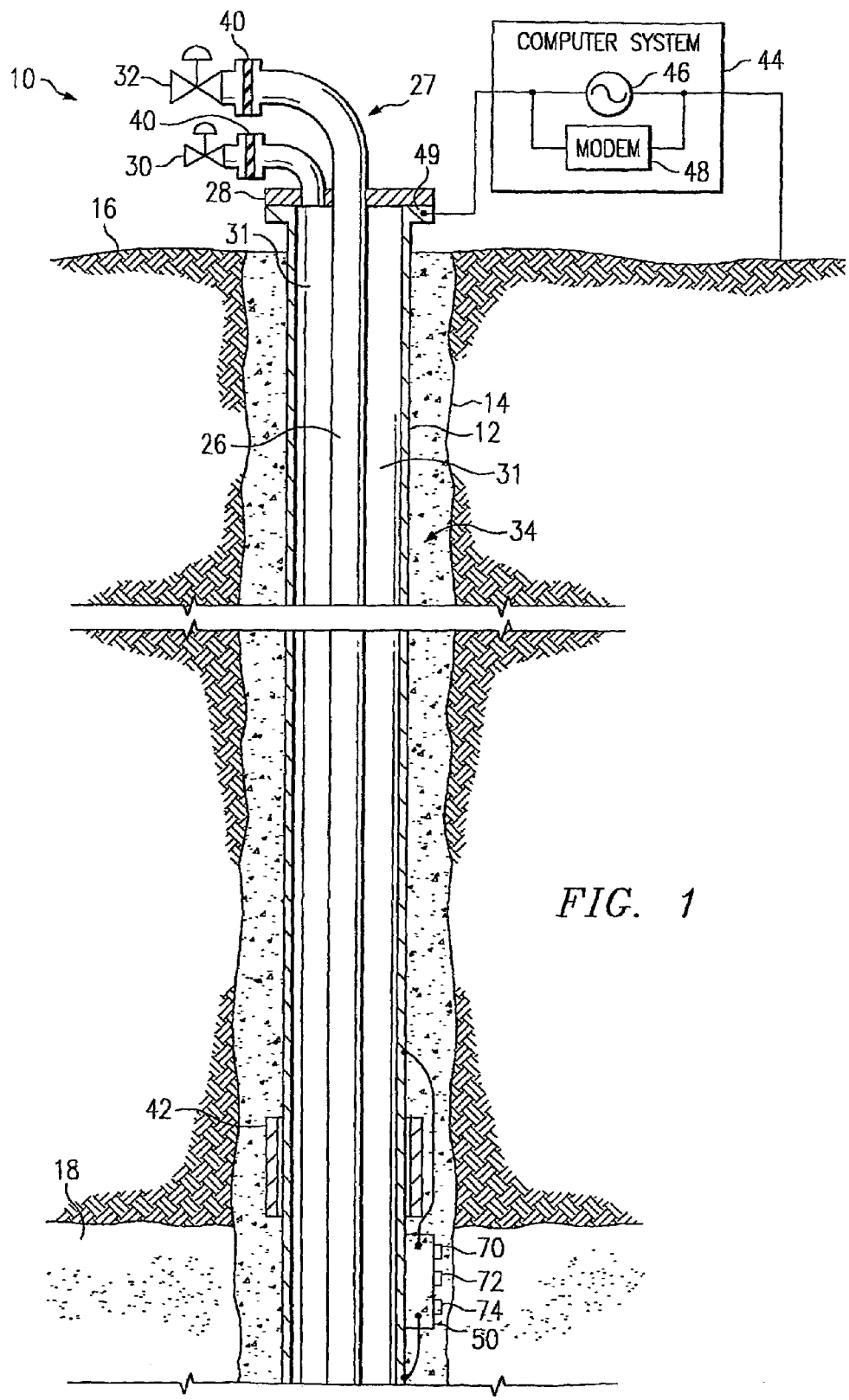
FIG. 1 is a schematic of a petroleum well having a downhole module attached to a casing, the downhole module being configured to measure formation characteristics according to the present invention.

As used in the present application, a "piping structure" can be one single pipe, a tubing string, a well casing, a pumping rod, a series of interconnected pipes, rods, rails, trusses, lattices, supports, a branch or lateral extension of a well, a network of interconnected pipes, or other structures known to one of ordinary skill in the art. The preferred embodiment makes use of the invention in the context of an oil well where the piping structure comprises tubular, metallic, electrically-conductive pipe or tubing strings, but the invention is not so limited. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from one location where a power source is electrically connected to another location where a device and/or electrical return is electrically connected. The piping structure will typically be conventional round metal tubing, but the cross-sectional geometry of the piping structure, or any portion thereof, can vary in shape (e.g., round, rectangular, square, oval) and size (e.g., length, diameter, wall thickness) along any portion of the piping structure.

A "valve" is any device that functions to regulate the flow of a fluid. Examples of valves include, but are not limited to, sub-surface safety valves used to control fluid flow in well tubulars, and bellows-type gas-lift valves and controllable gas-lift valves each of which may be used to regulate the flow of lift gas into a tubing string of a well. The internal workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. Valves can be mounted downhole in a well in many different ways, some of which include tubing conveyed mounting configurations, side-pocket mandrel configurations, or permanent mounting configurations such as mounting the valve in an enlarged tubing pod.

The term "modem" is used generically herein to refer to any communications device for transmitting and/or receiving electrical communication signals via an electrical conductor (e.g., metal). Hence, the term is not limited to the acronym for a modulator (device that converts a voice or data signal into a form that can be transmitted)/demodulator (a device that recovers an original signal after it has modulated a high frequency carrier). Also, the term "modem" as used herein is not limited to conventional computer modems that convert digital signals to analog signals and vice versa (e.g., to send digital data signals over the analog Public Switched Telephone Network). For example, if a sensor outputs measurements in an analog format, then such measurements may only need to be modulated (e.g., spread spectrum modulation) and transmitted—hence no analog-to-digital conversion is needed. As another example, a relay/slave modem or communication device may only need to identify, filter, amplify, and/or retransmit a signal received.

The term "processor" is used in the present application to denote any device that is capable of performing arithmetic and/or logic operations. The processor may optionally include a control unit, a memory unit, and an arithmetic and logic unit.

The term "sensor" as used in the present application refers to any device that detects, determines, monitors, records, or otherwise senses the absolute value of or a change in a physical quantity. Sensors as described in the present application can be used to measure temperature, pressure (both absolute and differential), flow rate, seismic data, acoustic data, pH level, salinity levels, valve positions, or almost any other physical data.

As used in the present application, "wireless" means the absence of a conventional, insulated wire conductor e.g. extending from a downhole device to the surface. Using the tubing and/or casing as a conductor is considered "wireless."

The term "electronics module" in the present application refers to a control device. Electronics modules can exist in many configurations and can be mounted downhole in many different ways. In one mounting configuration, the electronics module is actually located within a valve and provides control for the operation of a motor within the valve. Electronics modules can also be mounted external to any particular valve. Some electronics modules will be mounted within side pocket mandrels or enlarged tubing pockets, while others may be permanently attached to the tubing string. Electronics modules often are electrically connected to sensors and assist in relaying sensor information to the surface of the well. It is conceivable that the sensors associated with a particular electronics module may even be packaged within the electronics module. Finally, the electronics module is often closely associated with, and may actually contain, a modem for receiving, sending, and relaying communications from and to the surface of the well. Signals that are received from the surface by the electronics module are often used to effect changes within downhole controllable devices, such as valves. Signals sent or relayed to the surface by the electronics module generally contain information about downhole physical conditions supplied by the sensors.

In accordance with conventional terminology of oilfield practice, the descriptors "upper," "lower," "uphole," and "downhole" as used herein are relative and refer to distance along hole depth from the surface, which in deviated or horizontal wells may or may not accord with vertical elevation measured with respect to a survey datum.

The term "formation" as used in the present application refers to a bed or deposit composed throughout of substantially the same kinds of rock. A formation may or may not contain petroleum products.

Referring to FIG. 1 in the drawings, a petroleum well 10 having a wireless smart well casing 12 is illustrated. Petroleum well 10 includes a borehole 14 extending into a formation from a surface 16 to a production zone 18 that is located downhole. The casing 12 is disposed in borehole 14 and includes a structure of the type conventionally employed in the oil and gas industry. The casing 12 is typically installed in sections and is secured in borehole 14 during well completion with cement 34. A tubing string, or production tubing, 26 is generally conventional comprising a plurality of elongated tubular pipe sections joined by threaded couplings at each end of the pipe sections. Oil or gas produced by petroleum well 10 is typically delivered to surface 16 by tubing string 26.

A production platform 27 is located at surface 16 and includes a tubing hanger 28. Tubing hanger 28 supports tubing string 26 such that the tubing string 26 is concentrically positioned within casing 12. As illustrated in FIG. 1 production platform 27 also includes a gas input throttle 30 to permit the input of compressed gas into an annular space 31 between casing 12 and tubing string 26. Conversely, an output valve 32 permits the expulsion of oil and gas bubbles from an interior of tubing string 26 during oil production. While FIG. 1 illustrates a gas lift well, the present invention is not so limited, and the gas input throttle valve 30 and its associated input tubing is therefore optional.

Well 10 includes a communication system 44 for providing power and two-way communication signals downhole in well 10. Casing 12 acts as an electrical conductor for communication system 44. In accordance with the present invention, an induction choke 42 is positioned concentrically around casing 12 prior to securing the casing 12 within cement 34. Induction choke 42 serves as a series impedance to electric current flow along the casing 12. The size and material of lower induction choke 42 can be altered to vary the series impedance value; however, the lower induction choke 42 is made of a ferromagnetic material. Induction choke 42 is mounted concentric and external to casing 12, and is typically hardened with epoxy to withstand rough handling.

A means is provided to electrically insulate casing 12 and tubing string 26 from ground connection through surface ancillary tubing connected to valves 30 and 32. Insulators 40 provide this function as shown in FIG. 1, but alternative methods exist and will be clear to those of average skill in the art, such as the use of an insulated tubing hanger (not shown) in combination with an electrical isolation tubing joint (not shown). In alternative, another induction choke (not shown) can be placed about the casing above the electrical point of connection 49 of the surface power and communication equipment 44, or two such chokes may be placed individually about the production fluids tubing and the lift gas supply pipe. As noted in the related applications, inductive chokes such as 42 external to the casing act to impede current flow on both casing and tubing at the points where these pass through such inductive chokes.

By electrically isolating a section of casing 12, power and communications signals can be supplied downhole along the casing 12 and tubing 26. While it is not an ideal electrical insulator, the cement 20 can be of low electrical conductivity and provides a degree of electrical isolation between casing 12 and the formation surrounding the well. Induction choke 42 further impedes current flow along casing 12 and tubing 26, thereby allowing the signals to be passed between induction choke 42 and the surface of the well. It is important to note that electrical contact between casing 12 and tubing string 26 does not short circuit the signals travelling along casing 12. Since tubing string 26 is also located within the annulus of induction choke 42, the choke 42 has the same electrical impedance effect on tubing string 26 as on casing 12. More specifically, current travelling down tubing string 26 is effectively blocked from travelling further downhole to a potential ground. Similar protection is provided at the top of tubing string 26 by insulating tubing joints 40. In practice the majority of the current conveyed into the well by the embodiment illustrated in FIG. 1 is carried on the casing, and the tubing contributes negligibly to the conveyance of power to depth in the well.

A computer and power source 44 including a power supply 46 and a spread spectrum communications device (e.g. modem) 48 is disposed outside of borehole 14 at surface 16. The computer and power source 44 is electrically connected to casing 12 at a current supply point 49 for supplying time varying current to the casing 12. Computer and power source 44 is grounded to surface 16. In operation the use of casing 12 as a conductor is lossy because of the imperfect electrical isolation provided by the cement 20. However, the spread-spectrum communications technique is tolerant of noise and low signal levels, and can operate effectively even with losses as high as −100 db.

As shown in FIG. 1, downhole electronics module 50 is positioned proximate to an exterior surface of the casing 12 prior to completion of the well. Downhole module 50 includes a plurality of sensors 70, 72, 74, for assessing formation characteristics (i.e. physical characteristics) about the formation that surrounds the well. These sensors could include resistivity sensors, pressure sensors, temperature sensors, flow rate sensors, corrosion sensors, or geophones. Each of these sensors can be used to obtain information about the characteristics of the formation. Additionally, hydrophones could be used to measure acoustic waves in well fluids within casing 12.

It is not obvious that sensors 70–74 would be able to measure formation characteristics such as pressure or resistivity, since they are embedded within cement 34 and not in direct connection with formation 18. However, while the permeability of cement 34 is low, it does not provide an absolute hydraulic seal. Since the flow of formation fluids through the cement is prevented by the casing 12, the pressure of fluids in the pore spaces of the cement 34 equilibrates with the pressure in the formation. Rapid changes in formation pressure cannot be measured, but slow changes can be measured, and it is data from slow changes as the reservoir is depleted that are valuable as an indication of reservoir condition.

The same considerations apply to other physical characteristics of the formation 18, such as fluid composition, which would be reflected in resistivity changes. The interpretation of such resistivity data differs from that for a conventional resistivity log of a well as measured by open-hole logging tools. Open-hole resistivity logs reveal the spatial variation of resistivity over the logged section of the formation, measured at essentially a single instant of time. The resistivity log acquired by the methods of the present invention is derived from a locationally static single sensor, but over an extended period of time. In both cases, changes in the resistivity are the features which reveal the condition of the formation: in the open-hole log, these are spatial changes, in the present invention, the changes are a function of time rather than spatial variations.

Downhole module 50 is configured to be mechanically connected to the casing 12 either above or below induction choke 42. Electrical connections to the downhole module 50 are provided by jumpers. Power is received at the downhole module 50 by a jumper connected to casing 12 above the induction choke 42. A ground return jumper is provided that connects downhole module 50 to casing 12 below induction choke 42.

Downhole module 50 also includes a spread spectrum transceiver (not shown) for communicating with modem 48 at the surface of the well 10. The transceiver enables sensor data representing the formation characteristics to be transmitted to the surface of the well 10 for use in optimizing production of the well 10. If multiple downhole modules 50 are positioned on the casing 12, the transceiver in each downhole module is able to communicate with transceivers in the other downhole modules, thereby allowing transceivers to relay signals and providing redundancy in the event of a failure of one of the downhole modules 50.

After positioning induction choke 42 and downhole module 50 on casing 12, the casing 12 is run into borehole 14. Cement 34 is injected into the annulus between the borehole and casing 12 to secure the casing within the borehole 14. The cement 34 also further secures the positioning of the induction choke 42 and the downhole module 50 relative to casing 12

Even though many of the examples discussed herein are applications of the present invention in petroleum wells, the present invention also can be applied to other types of wells, including but not limited to water wells and natural gas wells.

One skilled in the art will see that the present invention can be applied in many areas where there is a need to provide a communication system within a borehole, well, or any other area that is difficult to access. Also, one skilled in the art will see that the present invention can be applied in many areas where there is an already existing conductive piping structure and a need to route power and communications to a location on the piping structure. A water sprinkler system or network in a building for extinguishing fires is an example of a piping structure that may be already existing and may have a same or similar path as that desired for routing power and communications. In such case another piping structure or another portion of the same piping structure may be used as the electrical return. The steel structure of a building may also be used as a piping structure and/or electrical return for transmitting power and communications in accordance with the present invention. The steel rebar in a concrete dam or a street may be used as a piping structure and/or electrical return for transmitting power and communications in accordance with the present invention. The transmission lines and network of piping between wells or across large stretches of land may be used as a piping structure and/or electrical return for transmitting power and communications in accordance with the present invention. Surface refinery production pipe networks may be used as a piping structure and/or electrical return for transmitting power and communications in accordance with the present invention. Thus, there are numerous applications of the present invention in many different areas or fields of use.

It should be apparent from the foregoing that an invention having significant advantages has been provided. While the invention is shown in only a few of its forms, it is not just limited but is susceptible to various changes and modifications without departing from the spirit thereof.

We claim:

1. A petroleum well having a having a borehole extending into a formation and a piping structure including a casing positioned within the borehole, the petroleum well comprising:
    a downhole module positioned on the outside of the casing for collecting formation characteristic data of the formation;
    a communication system operably coupled to the piping structure and module such that the formation characteristic data can be communicated along the piping structure as a time-varying signal; and
    an induction choke external to the casing effective to impede current flow through the casing, wherein the downhole module receives power by a connection to the casing above the induction choke and a ground return below the induction choke.

2. The petroleum well according to claim 1, wherein the downhole module includes a pressure sensor.

3. The petroleum well according to claim 1, wherein the downhole module includes a flow rate sensor.

4. The petroleum well according to claim 1, wherein the downhole module includes a temperature sensor.

5. The petroleum well according to claim 1, wherein the downhole module includes a sensor for determining a resistivity value for the formation.

6. The petroleum well according to claim 1, wherein the downhole module includes a geophone for measuring acoustic waves.

7. The petroleum well according to claim 1, wherein the induction choke is positioned concentrically around the piping structure; and wherein the formation characteristic data is communicated along the piping structure between a current supply point and the induction choke.

8. In a petroleum well having a borehole extending into a formation and having a piping structure positioned within the borehole, a method for assessing the formation comprising the steps of:
    sensing a formation characteristic of the formation using sensors external to the piping structure;
    communicating the formation characteristic along the piping structure as a time varying signal applied to the piping structure; and
    providing a lower induction choke positioned concentrically around the piping structure; wherein communicating the formation characteristic along the piping structure is done between a current supply point and the lower induction choke.

9. The method according to claim 8, wherein the sensed formation characteristic is a formation fluid pressure.

10. The method according to claim 8, wherein the sensed formation characteristic is a formation resistivity.

11. The method according to claim 8, wherein the sensed formation characteristic is a formation fluid flow.

12. The method according to claim 8, wherein the sensed formation characteristic is a formation temperature.

13. A method of constructing a petroleum well having piping structure including casing, comprising the steps of:
    placing the casing within the borehole of the well;
    embedding one or more sensors in the borehole external to the casing;
    positioning an induction choke external to the casing effective to impede current flow; and
    providing a source of time-varying signals adapted for coupling to the piping structure of the well.

14. The method of constructing the well of claim 13, including cementing the casing in the borehole for at least a portion of thereof and embedding at least one of said sensors in the cement.

15. The method of constructing the well of claim 13, including operating the well comprising the substeps of:
    sensing a formation characteristic using one or more of said embedded sensors;
    communicating said sensed characteristic to a controller;
    changing an operating parameter of the well based on said formation characteristic.

16. The method of constructing the well of claim 13, including operating the well comprising the substeps of:
    sensing a formation characteristic using one or more of said embedded sensors;
    communicating said sensed characteristic to a surface computer as a time-varying signal along the piping structure.

* * * * *